United States Patent
Feeman

[11] 3,870,696
[45] Mar. 11, 1975

[54] BENZTHIAZOLE-AZO-(4-N-SULFOPROPYL)PHENYL COMPOUNDS

[75] Inventor: James F. Feeman, Wyomissing, Pa.

[73] Assignee: Crompton & Knowles Corporation, New York, N.Y.

[22] Filed: July 5, 1973

[21] Appl. No.: 376,604

Related U.S. Application Data

[63] Continuation-in-part of Ser. Nos. 4,096, Jan. 17, 1970, abandoned, and Ser. No. 102,231, Dec. 28, 1970, abandoned.

[52] U.S. Cl. ......... 260/158, 260/465 D, 260/465 E, 260/481 R, 260/507 R, 260/508, 260/509
[51] Int. Cl. ............... C09b 29/08, C09b 29/26
[58] Field of Search ........................ 260/158

[56] References Cited
UNITED STATES PATENTS
2,683,709  7/1954  Dickey et al. .................. 260/158

Primary Examiner—Floyd D. Higel
Assistant Examiner—C. F. Warren
Attorney, Agent, or Firm—Synnestvedt & Lechner

[57] ABSTRACT

Acid dyes for natural and synthetic polyamide fibers and for cellulose acetate fibers having the structure:

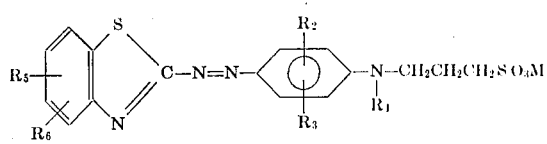

wherein $R_1$ is an alkyl, benzyl, cyclohexyl, $-CH_2CH_2OH$,

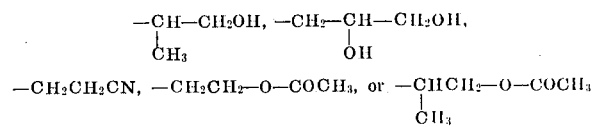

$R_2$ is $-H$, -alkyl, halogen, $-O-$ alkyl or $-NHCOR_4$;
$R_3$ represents $-H$, -alkyl, $-O-$ alkyl or $-NH-COR_4$;
$R_4$, as used in $R_2$ and $R_3$, represents -alkyl, -tolyl, -phenyl or -halophenyl;
$R_5$ is $-H$, $-NO_2$, halogen, $-SO_2$-alkyl, -alkyl and $-O-$ alkyl;
$R_6$ is $-H$, $-NO_2$, halogen and alkyl; and
M is $-H$, $-Na$, $-K$, $-Li$ or $-NH_4$.

6 Claims, No Drawings

BENZTHIAZOLE-AZO-(4-N-SULFOPROPYL)PHENYL COMPOUNDS

This application is a continuation-in-part of applications Ser. No. 4,096, filed Jan. 17, 1970, and Ser. No. 102,231, filed Dec. 28, 1970; both of said applications are now abandoned.

This invention relates to water-soluble heterocyclic sulfoalkyl monoazo acid dyes for natural and synthetic polyamide fibers and for secondary cellulose acetate fibers and to a method of making the dyes and to their utilization.

The new acid dyes of this invention have the Structure:

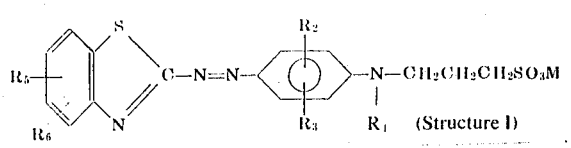

wherein $R_1$ is an alkyl radical having from 1 to 8 carbon atoms, benzyl, cyclohexyl, $$-CH_2CH_2OH, -CH-CH_2OH, -CH_2-CH-CH_2OH,$$
$$\qquad\qquad\quad\ \ \ |\qquad\qquad\qquad\quad\ \ |$$
$$\qquad\qquad\quad CH_3\qquad\qquad\qquad\ OH$$

$$-CH_2CH_2CN, -CH_2CH_2-O-COCH_3, \text{ or } -CHCH_2-O-COCH_3;$$
$$\qquad\qquad\qquad\qquad\qquad\qquad\qquad\qquad\qquad\qquad\quad |$$
$$\qquad\qquad\qquad\qquad\qquad\qquad\qquad\qquad\qquad\qquad CH_3$$

$R_2$ is —H, -alkyl having 1 to 4 carbon atoms, halogen, —O— alkyl having 1 to 4 carbon atoms or —NH-COR$_4$;

$R_3$ represents —H, -alkyl having 1 to 4 carbon atoms, —O— alkyl having 1 to 4 carbon atoms or —NH—COR$_4$;

$R_4$, as used in $R_2$ and $R_3$, represents -alkyl having 1 to 4 carbon atoms, -tolyl, -phenyl or -halophenyl;

$R_5$ is —H, —NO$_2$, halogen, —SO$_2$-alkyl, -alkyl and —O— alkyl;

$R_6$ is —H, —NO$_2$, halogen and alkyl; and

M is —H, —Na, —K, —Li or —NH$_4$.

These compounds are in general water-soluble acid dyes having a wide range of shades and exhibit good exhaustion from neutral to alkaline baths onto polyamides and onto secondary cellulose acetate rayon.

The Structure I compounds are made by diazotizing a 2-amino-benzothiazole and coupling the diazonium salt with an intermediate of Structure II (below), and optionally converting the resulting reaction product to a desired salt form by appropriate acidification and/or neutralization.

The intermediates useful in producing the dyes of this invention have the formula:

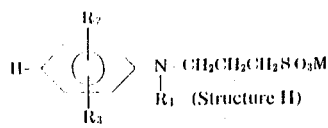

wherein $R_1$, $R_2$, $R_3$ and M have the same meaning as in Structure I; such intermediates can be produced by methods known in the are — see Belgian Pat. No. 761,714. For reasons of economy a preferred subgroup of very useful intermediates include:

N-ethyl-N-(m-tolyl)-3-amino-propane sulfonic acid;
N-methyl-N-(m-tolyl)-3-amino-propane sulfonic acid;
N-ethyl-N-phenyl-3-amino-propane sulfonic acid;
N-methyl-N-phenyl-3-amino-propane sulfonic acid
and the various R, Na, Li and NH$_4$ salts thereof Suitable 2-aminobenzothiazoles for use in making Structure I compounds in accordance with this invention include: 2-aminobenzothiazole, 2-amino-6-methylbenzothiazole, 2-amino-6-methoxybenzothiazole, 2-amino-6-ethoxybenzothiazole, 2-amino-6-chlorobenzothiazole, 2-amino-6-bromobenzothiazole, 2-amino-6-methyl-sulfonylbenzothiazole, 2-amino-4-nitro-6-methylsulfonylbenzothiazole, 2-amino-5,6-dichlorobenzothiazole, 2-amino-4,6-dinitrobenzothiazole, 2-amino-5-methyl-6-methylsulfonylbenzothiazole, etc.

Until now there has been a definite need for acid dyes having good solubility in water which could be applied to secondary cellulose acetate fibers to produce dyeings having good light-fastness and wetfastness. Conventional water-insoluble dispersed dyes which are in general use for dyeing cellulose acetate are notoriously lacking in fastness to washing and other wet treatments. Many previously available acid dyes which dye cellulose acetate from salt baths are deficient in other respects. They lack affinity for the fiber, having poor lightfastness or are uneconomical because of high cost of manufacture or low tinctorial value.

The present invention, however, particularly those dyeing in blue, violet or red shades, overcome the deficiencies listed above, in that they are economical to manufacture, dye acetate rayon in bright, light to heavy depths of shade, have very good lightfastness, have good to excellent wetfastness properties, and have outstanding solubility in water.

In addition these dyes have been found commercially useful for dyeing and printing nylon fabrics to produce level, lightfast blue, violet and red shades. Their exceptionally good water-solubility combined with good lightfastness, neutral-alkaline affinity and level dyeing properties allow them to fill needs in the textile dyeing industry.

This unusual combination of properties, in particular the high water solubility plus good netural-alkaline affinity and "pile-on" to heavy depths of shade, exhibited by many of the compounds of this invention allows their use in applications where short dye:liquor ratios are required such as in jig and pad dyeing and in printing operations.

The compounds of this invention are usually formed as sodium salts of the sulfonic acid and they can be used as such or converted to the free sulfonic acid by treatment with an inorganic acid and the free acids can then be converted to various other salts such as —Na, —K, —Li or —NH$_4$ by neutralization with a suitable hydroxide, carbonate or ammonia.

Although in the list of suitable 2-aminobenzothiazoles the chloro derivatives are sometimes specified, there is no technical reason for not believing that other correspondingly structured halo derivatives, namely the —Br, —F and —I derivatives, (when available) would be operable and substitutable for the chloro derivatives specified. Similarly, in the Structure I definitions of $R_1$, $R_2$, $R_3$, $R_4$ $R_5$ and $R_6$ where the term halogen or halo is used, the intermediates for producing chloro derivatives are usually the most readily available and cheapest, however there is no technical reason for not believing that other correspondingly halo derivatives, namely the —Br, —F, and —I derivatives (when available) would be operable for the purposes of this invention.

Throughout the application (unless otherwise specified) where the term alkyl is used, it is intended to indicate an alkyl chain of any length that will not adversely influence the solubility of the dye, and particularly the lower alkyls having 1 to 5 carbons.

The following examples will serve to illustrate the preparation of representative dyes of this invention, the utilization of the dyes in the dyeing of polyamides and secondary cellulose acetate fibers, and the novel dyeings thereby produced.

In these examples, parts and percentages are by weight and temperatures are in degrees centigrade, unless otherwise stated.

EXAMPLE 1

A solution of 4.9 g. of 2-amino-6-nitrobenzothiazole in 50 ml. of 85% phosphoric acid was cooled with an ice-salt bath to 0° to —5° C. While keeping the temperature within these limits, 1.52 g. of sodium nitrite dissolved in 5 ml. of water was added during 20 minutes, after which the mixture was stirred for an additional 75 minutes at about —5° C.

A solution of 8 g. of N-ethyl-N-(m-tolyl)-3-aminopropane sulfonic acid (as the K salt) was dissolved in 50 ml. of cold water and 150 g. of ice was added. While stirring the diazonium salt solution in phosphoric acid was added to the coupler giving a precipitate of the monoazo dye. After 30 minutes the solid precipitate was filtered off. It was repasted in 50 ml. of water and the pH adjusted to 9–10 with 50% NaOH solution. The Na salt of the dye was filtered and dried. It is a dark colored solid which is soluble in water and dyes secondary cellulose acetate rayon from dyebaths containing sodium chloride, and nylon from acid, neutral or alkaline dyebaths in violet shades.

Further examples of dyes prepared by coupling various 2-aminobenzothiazoles with N-ethyl-N-(m-tolyl)-3-aminopropane sulfonic acid according to the general procedures of Example 1 are listed in Table I. These dyes have the general structure:

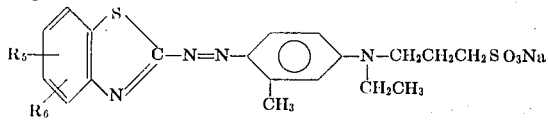

I claim:
1. A compound having the structure:

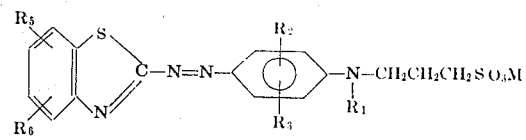

wherein $R_1$ is alkyl having from 1 to 8 carbon atoms, benzyl, cyclohexyl,

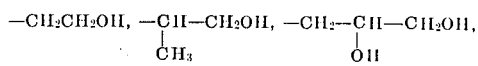

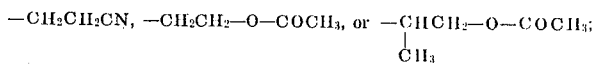

$R_2$ is —H, -alkyl having 1 to 4 carbon atoms, halogen, —O— alkyl having 1 to 4 carbon atoms or —NH-COR$_4$;

$R_3$ represents —H, -alkyl having 1 to 4 carbon atoms, —O— alkyl having 1 to 4 carbon atoms or —NH—COR$_4$;

$R_4$, as used in $R_2$ and $R_3$, represents -alkyl having 1 to 4 carbon atoms, -tolyl, -phenyl or -halophenyl;

$R_5$ is —H, —NO$_2$, halogen, —SO$_2$-alkyl, -alkyl and —O— alkyl;

$R_6$ is —H, —NO$_2$, halogen and alkyl; and

M is —H, —Na, —K, —Li or —NH$_4$.

2. A compound according to claim 1 having the structure:

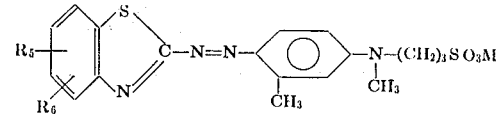

3. A compound according to claim 1 having the structure:

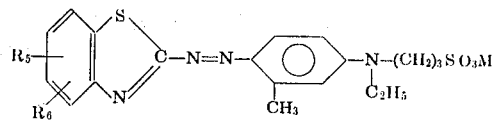

TABLE I

| Example No. | Amine Diazotized and Coupled | Shade of Dyeing on Acetate Rayon | Nylon 66 |
|---|---|---|---|
| 2 | 2-Aminobenzothiazole-6-methyl-sulfone | bluish-red | bluish-red |
| 3 | 2-Aminobenzothiazole | red | red |
| 4 | 2-Amino-6-methyl-benzothiazole | red | red |
| 5 | 2-Amino-6-methoxy-benzothiazole | red | red |
| 6 | 2-Amino-6-chloro-benzothiazole | red | red |
| 7 | 2-Amino-5,6-dichloro-benzothiazole | violet | violet |

4. A compound according to claim 1 having the structure:
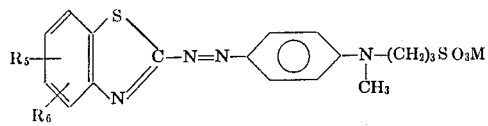
5. A compound according to claim 1 having the structure;
6. A compound according to claim 1 having the structure:
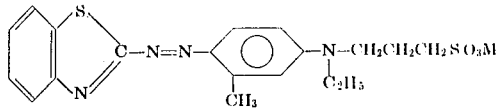
\* \* \* \* \*